(12) United States Patent
Lindelof et al.

(10) Patent No.: US 9,921,590 B2
(45) Date of Patent: Mar. 20, 2018

(54) TEMPERATURE CONTROL UNIT FOR THE HEATING SYSTEM IN A BUILDING

(71) Applicants: David Lindelof, Aire-la-Ville (CH);
Antoine Guillemin, Penthaz (CH);
Sohail Malik, Scherz AG (CH)

(72) Inventors: David Lindelof, Aire-la-Ville (CH);
Antoine Guillemin, Penthaz (CH);
Sohail Malik, Scherz AG (CH)

(73) Assignee: NEUROBAT AG, Gossau SG (CH)

( * ) Notice: Subject to any disclaimer, the term of this patent is extended or adjusted under 35 U.S.C. 154(b) by 403 days.

(21) Appl. No.: 14/371,198

(22) PCT Filed: Dec. 24, 2012

(86) PCT No.: PCT/IB2012/002796
§ 371 (c)(1),
(2) Date: Jul. 9, 2014

(87) PCT Pub. No.: WO2013/104948
PCT Pub. Date: Jul. 18, 2013

(65) Prior Publication Data
US 2015/0032267 A1 Jan. 29, 2015

(30) Foreign Application Priority Data
Jan. 12, 2012 (CH) .......................................... 57/12

(51) Int. Cl.
*F24F 11/00* (2006.01)
*G05D 23/13* (2006.01)
(Continued)

(52) U.S. Cl.
CPC ........ *G05D 23/1393* (2013.01); *F24F 11/008* (2013.01); *F24F 11/0012* (2013.01); *G05B 13/027* (2013.01); *G05D 23/1917* (2013.01)

(58) Field of Classification Search
CPC .......... F24F 11/0009–11/0012; F24F 11/0015; F24F 11/006; F24F 11/008;
(Continued)

(56) References Cited

U.S. PATENT DOCUMENTS 4,220,846 A * 9/1980 Rice ...................... F24H 3/0405
252/502
6,137,886 A * 10/2000 Shoureshi ............. F16F 15/002
381/71.2
(Continued)

FOREIGN PATENT DOCUMENTS

EP 0 980 034 2/2000

OTHER PUBLICATIONS

Machine Translation of EP 0980034, Google Patents [online], 2000 [retrieved Oct. 25, 2016], Retrieved from Internet: <URL: http://www.google.com/patents/EP0980034A1?cl=en>, pp. 1-8.*
(Continued)

*Primary Examiner* — Todd Aguilera
(74) *Attorney, Agent, or Firm* — Young & Thompson

(57) ABSTRACT

A heating control unit for a building with a heating system, which includes heat exchangers supplied by a boiler, a loop for circulating the heating fluid including a mixing valve, radiators, a return loop, and a control circuit which receives information on the indoor and outdoor conditions in order to control the mixing valve. The control unit includes elements for predicting and optimizing the heating needs of the users of the building and for providing the control circuit with modified information on the outdoor temperature likely to adjust the parameters of the heating system to the needs of the users and minimize power consumption.

9 Claims, 4 Drawing Sheets

(51) Int. Cl.
*G05B 13/02* (2006.01)
*G05D 23/19* (2006.01)

(58) Field of Classification Search
CPC .......... F24F 11/0034; F24F 2011/0013; F24F 2011/0016; F24F 2011/0035; F24F 2011/0036; F24F 2011/0049; F24F 2011/0058; F24F 2011/0075; F24F 2011/0082; F24F 2011/0045; G05D 23/13–23/1393; G05D 23/1917; G05D 23/1927; G05B 2219/2614; G05B 2219/2638; G05B 2219/2468; G05B 2219/2648; G05B 13/027; G05B 13/0285; G05B 13/029; G05B 2219/2525; Y02B 70/3275; Y02S 20/244
USPC .................................................. 700/276–278
See application file for complete search history.

(56) References Cited

U.S. PATENT DOCUMENTS

| | | | | |
|---|---|---|---|---|
| 7,246,753 B2* | 7/2007 | Hull | ...................... | F24F 11/006 236/49.3 |
| 8,155,900 B1* | 4/2012 | Adams | ................. | F24F 11/0012 702/62 |
| 2004/0256473 A1* | 12/2004 | Hull | ...................... | F24F 11/006 236/49.3 |
| 2005/0192680 A1* | 9/2005 | Cascia | ................. | G05B 13/027 700/29 |
| 2011/0295430 A1* | 12/2011 | Kouninski | ......... | G05D 23/1906 700/278 |

OTHER PUBLICATIONS

Morel N., et al., "Neurobat, A Predicitve and Adaptive Heating Control System Using Artificial Neural Networks", International Journal of Energy [online], Apr. 2001, vol. 21 [retrieved Sep. 12, 2017], Retrieved from Internet <URL:https://infoscience.epfl.ch/record/176117/files/e_Int-Journal_Solar_Energy_May_2001_English.pdf>, pp. 1-31.*

International Search Report dated Apr. 12, 2013, corresponding to PCT/IB2012/002796.

Jaeho Baek, et al.; "Simulational Analysis of Adaptive Outdoor Reset Control based on Fuzzy Target Temperature Gap for a Hydronic Radiant Floor Heating System"; vol. 9, No. 1; May 2, 2010; pp. 251-257.

* cited by examiner

TEMPERATURE CONTROL UNIT FOR THE HEATING SYSTEM IN A BUILDING

TECHNICAL FIELD

The present invention relates to a heating control system for a building or a built up structure that operates neural networks, or equivalents, in order to perform predictive functions and functions aimed at learning the behaviour of the building, meteorological functions and/or user comfort.

STATE OF THE ART

Such a heating control system has already been described in the European patent EP 0 980 034 B1. This system of the prior art has been designed for developing, based on various types of information provided by both internal as well as external sensors by means of neural networks, a set point temperature to be applied to the control block of a conventional heating system. In a conventional heating system this set point temperature is compared to the input temperature of the heating circuit and the difference is used to control a mixing valve which regulates the temperature of the heat transfer fluid supplied to the said heating circuit.

The system according to the prior art takes into account factors such as the external environment, the thermal behaviour of the building and/or user comfort as well as their predictive evolution in order to optimise the energy to be supplied to the heating system installation; this energy being dependent upon the difference between the temperature of the input fluid and that of the return fluid. However, such a concept for optimising the energy to be supplied has the drawback of being poorly or even not at all applicable to heating system installations which make use of thermostatic valves, for example, in radiators. Indeed, if all the thermostatic valves are closed, it makes no sense to supply a given amount of energy because this energy cannot be consumed. This may therefore be followed by a hard to control drift of the heating system.

Another drawback of the system described in the prior art is that its installation entails the adaptation of the existing conventional system and therefore, on the one hand, requires the intervention of a specialist technician and, on the other hand, increases the total cost of the installation.

DISCLOSURE OF THE INVENTION

A goal of the present invention is a heating control system for a building that aims to overcome the drawbacks mentioned here above.

A goal of the present invention is a heating control system for a building that can be used with all conventional heating systems, including those that make use of thermostatic valves.

Another goal of the present invention is a heating control system that, during installation thereof, does not require a significant modification of the conventional system installed on site.

Another goal of the present invention is a heating control system that can be easily disconnected so as to operate only the conventional system installation.

Another goal of the present invention is a heating control system that may be operated, via an internet connection from a remote site.

The object of the present invention thus relates to a heating control system for a building comprising the means for predicting climatic conditions, the means for predicting the interior temperature within the building, the means for generating an information variable relating to the comfort of users of the building, the means for optimising the initial flow temperature of the heat transfer fluid supplied to the heating circuit and the means for determining the modified exterior temperature.

According to one characteristic feature of the invention, the said modified exterior temperature is provided to the said control circuit controlling the mixing valve for mixing the input circuit of the heating system instead and in place of the value of the exterior temperature.

BRIEF DESCRIPTION OF DRAWINGS

Other characteristic features and advantages of the present invention will become more apparent upon the reading of the following description of an example implementing the invention; said description being provided purely for illustrative purposes only and in relation to the accompanying drawings in which.

EMBODIMENT(S) OF THE INVENTION

Figure 1:
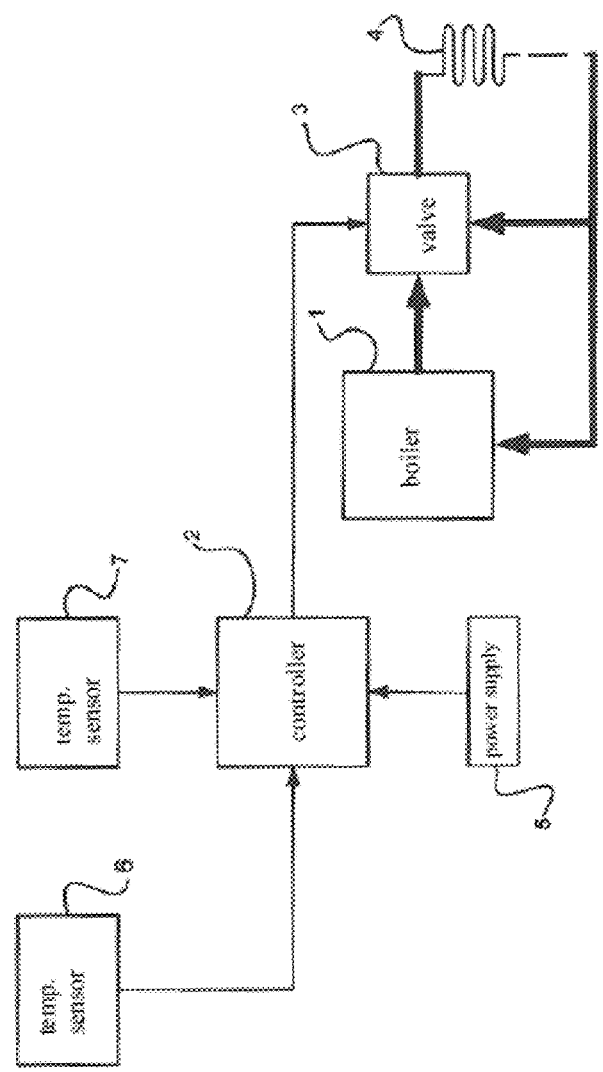
FIG. 1 shows a diagram of a conventional heating system installation for a building.

In FIG. 1, a conventional heating control system for a building has been shown schematically. The network of the heat transfer fluid, for example water, is represented by thick lines, whereas the information network is represented in thin lines. The water heated by the boiler 1 is sent to a mixing valve 3, the output of which supplies the radiators 4. The return water, after circulation in the radiators, is returned to the boiler 1 and to the mixing valve 3. The proportional amount of return water taken by the mixing valve is determined by the command sent from the control block 2, which is a controller device. The latter generates the control signal on the basis of information and readings such as those provided by exterior temperature sensors 6 and interior temperature sensors 7 as well as other information related to the system itself, to the building as well as to other internal parameters defined by the installer, such as the heating curve, etc. A pump (not shown) may be part of the input circuit and may be controlled by the said control circuit. Also indicated is an electric power supply circuit 5 for supplying power to the control block 2.

Figure 2:
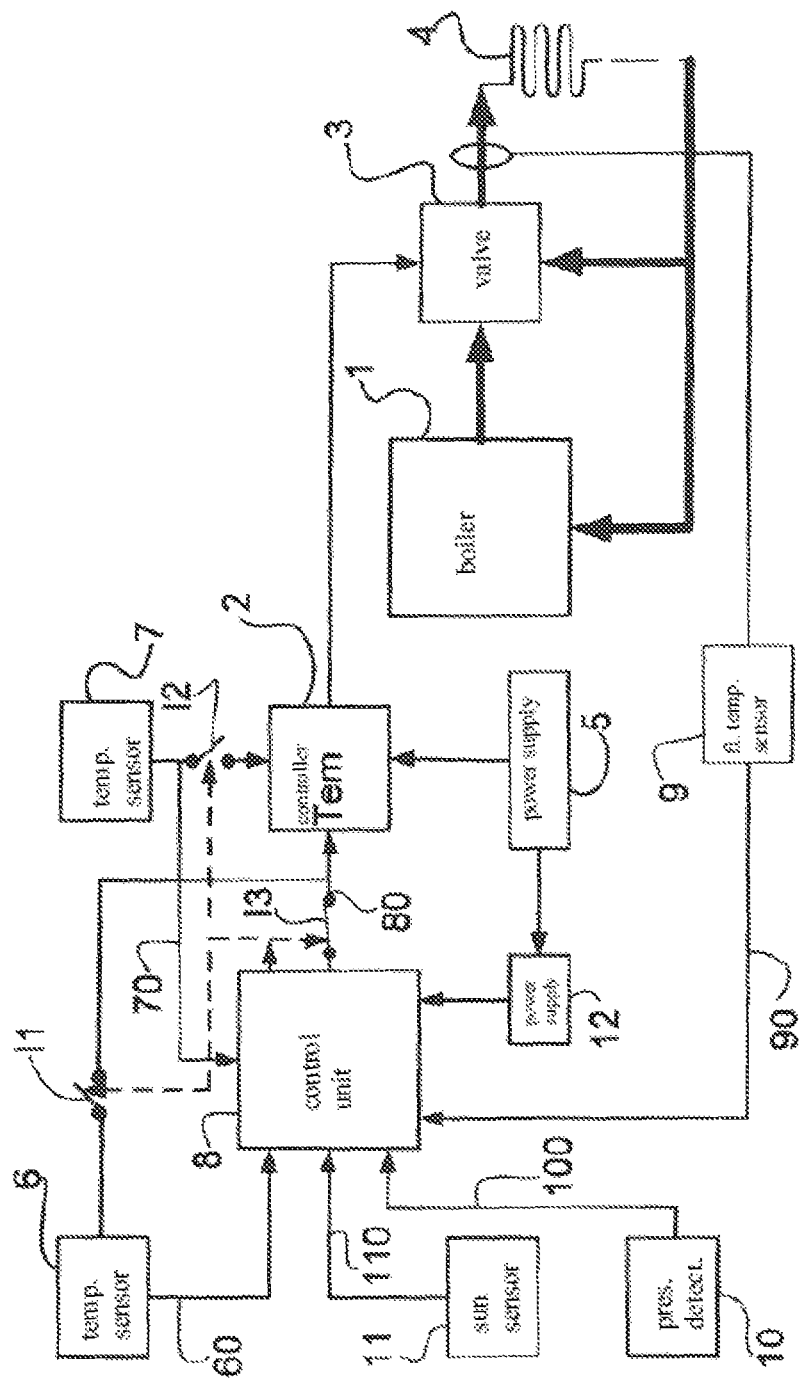
FIG. 2 shows a general block diagram of a heating system installation according to the invention that includes a system for determining the modified exterior temperature.

FIG. 2 schematically shows a control system in accordance with the principles of the present invention. As mentioned earlier, this control system is added on to the traditional systems, such as the one represented in FIG. 1. One thus finds the boiler 1, the control block 2, the mixing valve 3, the heat diffusion devices or radiators 4, the electric power supply unit 5, as well as the sensors 6 and 7 for exterior and interior temperature respectively. In addition to the elements of a conventional system, there is a control unit 8, as well as its own power supply 12 connected to the electric power supply unit 5, an input fluid temperature sensor 9, a presence detector 10 and a sun light sensor 11. The switches ll, 12 operated under the control of the control unit 8, ensure the ability to disconnect the connection between the temperature sensors 6 and 7, respectively, and the control block 2 when the control system of the invention is active. In this case, the outputs 60 and 70 of the sensors 6 and 7, as well as those, 110, 100 and 90 of the sun light sensor 11, of the presence detector 10 and the input fluid temperature sensor 9 are each applied to an inlet of the control unit 8. The output 80 of the control unit 8 is applied, via the switch I3 (also controlled by the control unit 8), to the control block 2 on its input Tem initially connected to the exterior temperature sensor 6. It should be understood, however, that depending on the existing installations, it may sometimes be necessary to replace the exterior temperature sensors and interior temperature sensors of the conventional system installation with equivalent sensors (not shown) that are however compatible with the control unit 8.

According to the present invention, the control unit 8, based on the information and readings that it receives, generates a signal for modified exterior temperature Tem that it applies to the input of the control block 2, conventionally connected to the output of an exterior temperature sensor. The control block 2 acts exactly as if it had received a value for the exterior temperature when in fact it receives a value modified by the control unit 8, as it is explained in connection with FIG. 3. There is therefore no longer, as was the case with the control system of the prior art mentioned above, need for determination of the amount of energy to be provided to the system and, consequently, no longer a risk of malfunction due to the use of thermostatic valves in the heating system.

FIG. 2 shows, moreover, that the system according to the invention connects to conventional heating system installed without requiring modification of the latter. The consequences thereof are, on the one hand, a clearly evident reduction in installation costs and, on the other hand, a greater ease of shutting down the system according to the invention for reasons related to the maintenance thereof or otherwise. In the case where the temperature sensors 6 and 7 must be changed in order to be compatible with the control unit 8, the switches I1 and I2 are then mounted in a manner so as to disconnect the old sensors and to connect in their place the new sensors (not shown). Furthermore, if the control unit 8 is disconnected (switch 13 open), the switches I1 and I2 automatically reconnect the sensors 6 and 7 to the control block 2 in a manner such that that the latter returns to its original normal operation. If, as previously indicated above, the sensors 6 and 7 had been changed in order to be compatible with the control unit 8, the disconnection of the latter leads to the reconnection of previous temperature sensors 6 and 7 to the control block 2 by means of the switches I1 and I2 adapted accordingly.

Figure 3:
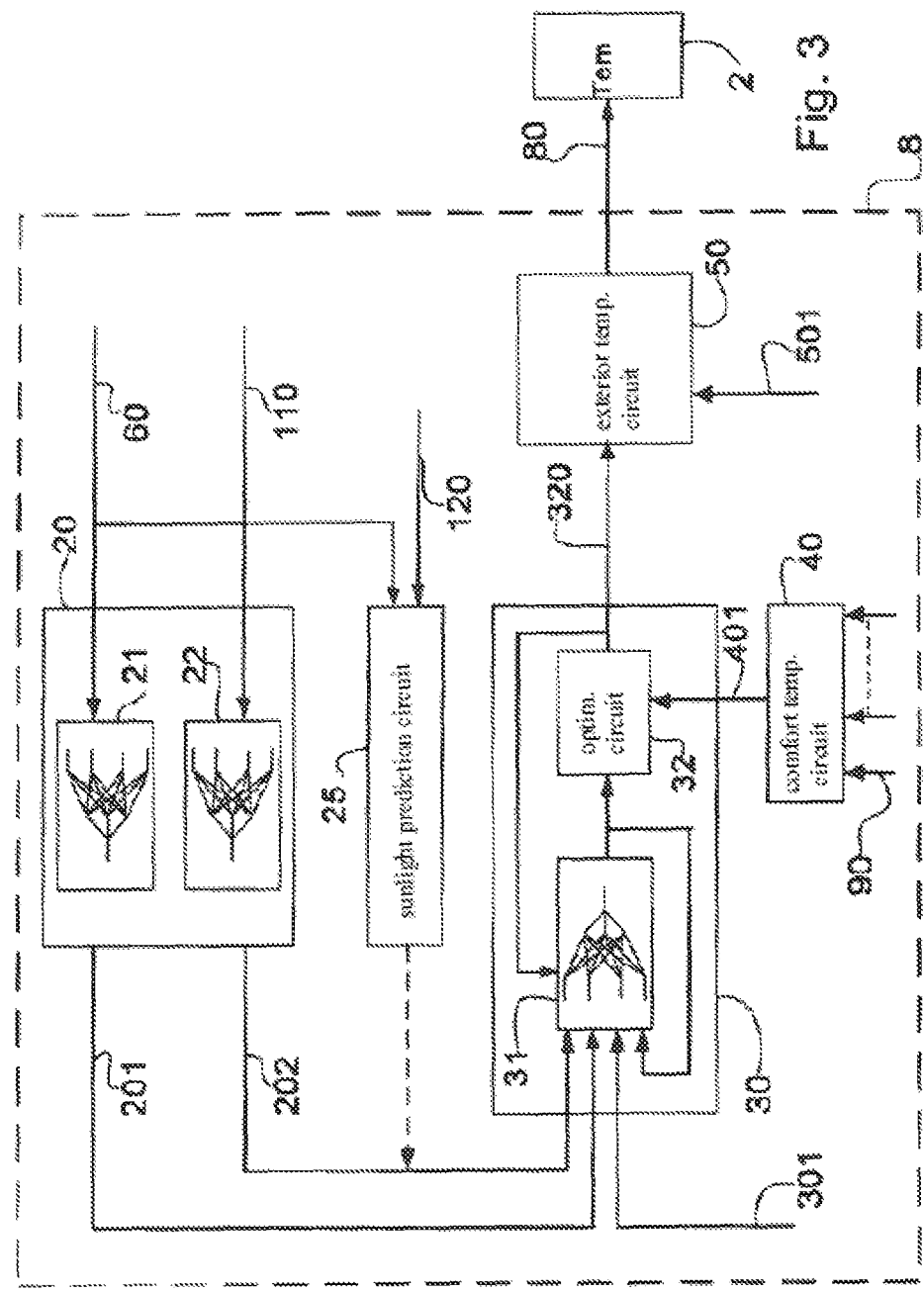
FIG. 3 shows a detailed diagram of the said system for determining the modified exterior temperature.

FIG. 3 shows, in a detailed manner, the control unit 8 in conformity with the invention. This control unit comprises an assembly 20 of two neural networks 21 and 22, a block 30 for determining the set point temperature, a circuit 50 for determining the modified exterior temperature and a circuit 40 for determining the comfort temperature. Optionally, the control unit may comprise a computing circuit 25 for computing the prediction of sun light.

The neural networks 21 and 22, on the basis of the signals 60 and 110 coming from, respectively, the exterior temperature sensor 6 and the sun light sensor 11, determine the vectors of the predicted values of the exterior temperature (output 201) and of the predicted values for sun light (output 202). The neural networks 21 and 22 function as described in the aforementioned document of the prior art. It is the same for the circuit 25 that can deliver a vector of predicted values of sun light based on the values provided by the exterior temperature sensor on the connection 60 and information pertaining to the sun light provided by a meteorological service and applied to the input 120. When a circuit 25 is provided, its output vectors are applied on the connection 202 to the block 30. This block 30 comprises a neural network 31 and an optimisation circuit 32 for optimising the initial flow temperature. The neural network 31 receives as input the output vectors of the block 20 (eventually the output of the circuit 25), the value of interior temperature (or ambient temperature) on the connection 301, as well as the output of the circuit 32 and its own output.

The neural network 31, the operation of which is similar to that disclosed in the patent of the prior art cited above, represents the thermal model of the building and its output is a vector that represents the interior temperature predicted over a given time interval, for example, over the following six hours. Thus, the first output value of the network 31 corresponds to the value of the ambient temperature and, subsequently, the output value will also depend on past values of the predicted interior temperature.

The circuit 32 determines and provides at its output 320 the optimised initial flow temperature. As previously indicated, its output vectors are looped on to the input of the neural network 31 in order for the output of the network 31 to be closest to the value of the comfort temperature vector, provided by the circuit 40 at its output 401, while having an output value for the circuit 32 that is as low as possible. The circuit 40 for determining the comfort temperature receives, as input, the value of the temperature desired by the user (input 90), the indication of the presence/absence of the latter (this indication may be presented in the form of a vector for prediction of presence established on the basis of a historical data set of a previous period), an indication of an open window or any other indication of comfort like, for example, a mode of comfort or economy. The output information of the circuit 40, which constitutes the value of the desired comfort temperature, quite obviously depends on the value of all of the inputs. Thus, it should be understood that if the user is absent, if a window is open or if the selected mode is an economy mode, the value of the output information 401 may be accordingly reduced. The so called determination circuit 50, for determining the modified exterior temperature, receives as input on the connection 320 the optimised initial flow temperature and on the connection 501 the measured flow temperature and it delivers to the block 2, on the connection 80, a signal for the modified exterior temperature value. The circuit 50 may be of the type known as PID (for "proportional integral derivative") controller, or equivalent, which designates a control member that ensures the ability to perform a closed loop control. The greater the difference between its inputs the greater will be its output signal.

Figure 4:
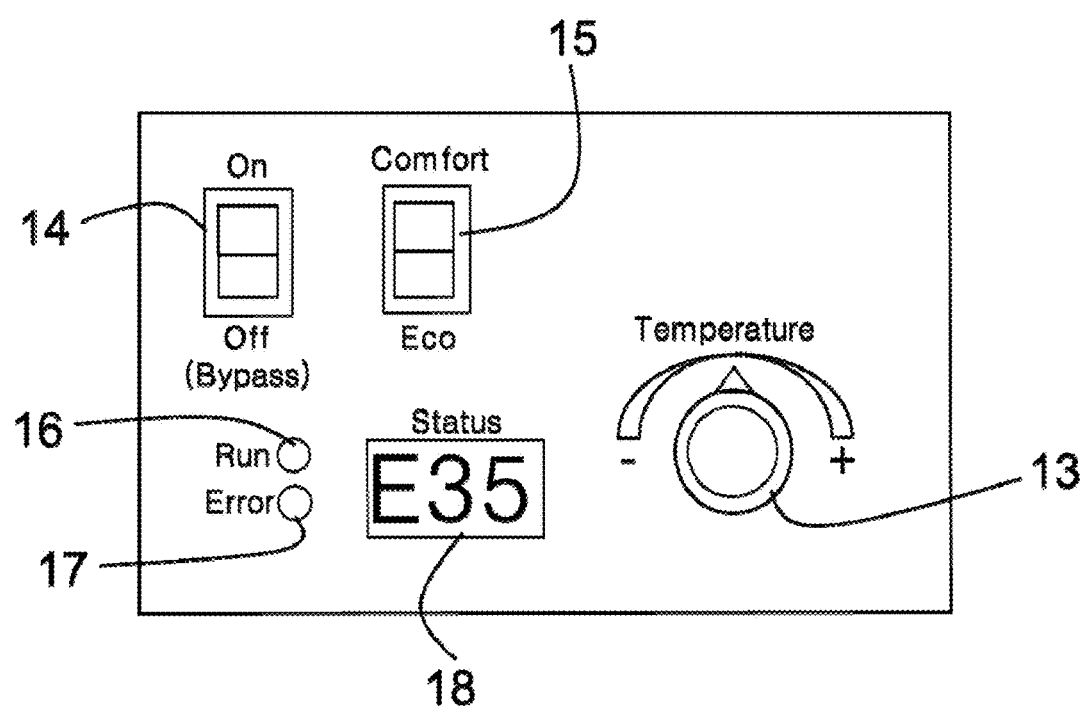
FIG. 4 shows an example of a control panel for use by users.

FIG. 4 shows an example of a control panel for use by users. It includes a button 13 for adjusting the set point temperature, an on/off switch 14, an engagement switch 15 for turning on the comfort or economy mode, an indicator light 16 for indicating proper operation of the heating system installation, an indicator light 17 for indication of operating malfunction and a display screen 18 for displaying the error code (making reference to a manual that is available to the user or to the specialist technician in charge of the system installation). The switch 14 controls the switching on or off (short circuit) of the system installation of the invention. The switch 15 enables the selection of the mode of operation of the system desired by the user. This information is sent to the circuit 40 for determining the comfort temperature, as well as to the circuit 32 for optimising the initial flow temperature. The effect of this information on the circuit 40 has already been explained. With regard to the circuit 32, it should be mentioned that if the "comfort" position is selected, the circuit 32 will minimise on a priority basis the difference between its two inputs (that is to say, the output value of the network 31 being as close as possible to the output value of the circuit 40 and if the "Eco" position is selected, then the circuit 32 will minimise on a priority basis the value of its output. The button 13 provides the ability to take action so as to raise or lower the value of the set point temperature; which action is transmitted to the circuit 40 for determining the comfort temperature.

According to an advantageous variant of the present invention, the control unit is implemented on a remote site and the heating system installation of the user is equipped with a modem capable of sending, for example via the Internet, the information and readings required, namely: interior and exterior temperatures, flow water temperature, level of sun light, the presence of the user, set point temperature etc; and of receiving information relating to the modified exterior temperature determined by the control unit on the remote site. Alternatively, the information transmitted to the heating system installation will be information relating to the optimised initial flow temperature (that is, information on the output 320). Such an arrangement is particularly advantageous for large installations and facilities that are already equipped with IT means.

In addition, it should be noted that a remote connection also provides the ability to make updates to the control system according to the invention.

The above description has been made with reference to a particular example of an embodiment. It is clearly obvious, however, that the invention may be arranged as per the defined needs without however departing from its scope. Moreover, although mention has been made of a conventional application using water as a heat transfer fluid as well as indicating the use of radiators as heat distributor, it is nevertheless obvious that the invention may also be applied in buildings with underfloor heating or even with other fluids or media, for example, such as air.

The invention claimed is:

1. A temperature control system in a heating system installation for a building using a heat transfer fluid heated by a boiler, comprising:
   a heating circuit configured to transport the heat transfer fluid from the boiler;
   a plurality of radiators;
   a mixing valve configured to mix fluid coming from the radiators with fluid from the boiler in order to feed the heating circuit and that acts, in response to a signal received at the mixing valve, to subject a temperature of the heat transfer fluid to a set point temperature, depending on an exterior temperature value measured by an exterior temperature sensor; and
   a control unit connected with an input fluid temperature sensor, a presence detector, a sunlight sensor, and temperature sensors for measuring the temperature inside and outside of the building, the control unit comprising
   an assembly of two first neural networks,
   a circuit system configured to determine the set point temperature value, the circuit system comprising a second neural network and an optimization circuit configured to optimize the heat transfer fluid, an output of the optimization circuit being looped on an input of the second neural network, and
   a temperature comfort determining circuit configured to determine a temperature of comfort for a user inside the building, the temperature comfort determining circuit being connected at an output to an input of the optimization circuit and to an input, via the optimization circuit, of an exterior temperature determining circuit configured to determine a determined exterior temperature signal, the exterior temperature determining circuit determining the determined exterior temperature signal based on an optimized temperature of the heat transfer fluid from the optimization circuit and a measured flow temperature of the heat transfer fluid, the input of the exterior temperature determining circuit being connected at an output of the optimization circuit.

2. The temperature control system of claim 1, wherein said assembly of first neural networks receives information corresponding to an exterior temperature from an exterior temperature sensor and a reading for sunlight and supplies k components of a first exterior temperature vector and a second sunlight vector, said k components representing predictions for the exterior temperature and sunlight for k future elementary periods.

3. The temperature control system of claim 2, wherein the assembly of first neural networks generates a linear combination of input values, each of said input values being assigned a weighting coefficient that is correctable by an adjustment device as a function of a predicted value and an actual value.

4. The temperature control system of claim 1, wherein said exterior temperature determining circuit configured to determine the computed exterior temperature is a proportional integral derivative (PID) control circuit.

5. The temperature control system according to claim 1, wherein the temperature comfort determining circuit configured to determine the temperature of comfort of the user inside the building receives information corresponding to a value of the temperature desired by the user of the building set from a control panel and a value from the presence sensor.

6. The temperature control system according to claim 1, wherein the assembly of first neural networks, the circuit system, and the exterior temperature determining circuit are implemented at a remote site linked via an internet connection to said heating system of the building.

7. The temperature control system according to claim 1, wherein said radiators are installed in floors of said building.

8. The temperature control system according to claim 1, wherein said heat transfer fluid is air.

9. The temperature control system according to claim 1, wherein the temperature control system is connectable to an existing system installation without modification of the conventional existing system installation.

* * * * *